United States Patent [19]
Kondo

[11] Patent Number: 4,821,104
[45] Date of Patent: Apr. 11, 1989

[54] IMAGE SENSOR HAVING REDUCED FIXED-NOISE OUTPUT USING FLIP FLOP CIRCUIT

[75] Inventor: Ryuji Kondo, Kanagawa, Japan

[73] Assignee: Fuji Photo Film Co., Ltd., Kanagawa, Japan

[21] Appl. No.: 43,721

[22] Filed: Apr. 29, 1987

[51] Int. Cl.[4] .............................................. H04N 5/335
[52] U.S. Cl. ........................ 358/213.18; 358/213.15
[58] Field of Search ..................... 358/213.15, 213.18, 358/213.16, 213.11, 50, 909; 357/30, 32

[56] References Cited

U.S. PATENT DOCUMENTS

| | | | |
|---|---|---|---|
| 4,045,817 | 8/1977 | Nakatani et al. | 358/213 |
| 4,145,721 | 3/1979 | Beaudouin et al. | 358/213 |
| 4,500,927 | 2/1985 | Ozawa | 358/293 |
| 4,511,804 | 4/1985 | Ozawa | 358/213 |
| 4,746,984 | 5/1988 | Matsumoto et al. | 358/213.12 |

Primary Examiner—Edward L. Coles, Sr.
Assistant Examiner—Robert M. Bauer
Attorney, Agent, or Firm—Sughrue, Mion, Zinn, Macpeak & Seas

[57] ABSTRACT

An image sensor having means for reducing fixed-pattern noise in its output signal. Real and dummy output lines are provided. First and second sets of transistors, driven by the horizontal shift register, couple, respectively, outputs of the sensor array and a floating line onto the real and dummy lines at read-out time. Because the fixed-pattern noise signal on the real and on the dummy lines is the same, the differential voltage between the two lines is entirely due to the actual signal. A flip-flop circuit is connected between the real and dummy lines to sense and amplify the differential voltage.

8 Claims, 2 Drawing Sheets

Ta : FLIP-FLOP CHARGING TIME
Tb : PIXEL READ TIME
Tc : SIGNAL READ OUT TIME

IMAGE SENSOR HAVING REDUCED FIXED-NOISE OUTPUT USING FLIP FLOP CIRCUIT

BACKGROUND OF THE INVENTION

The present invention pertains to a solid-state image sensor device of a type which may be used to advantage in a video camera or the like.

A conventional image sensor device of the type to which the present invention relates is shown in block diagram form in FIG. 1. In this device, a sensor array 10 is provided having a large number of pixels (picture elements) arranged in rows and columns. To produce an electronic signal representing a sensed image, the sensor array 10 is exposed to the desired image. Following exposure, a vertical shift register 12 activates its output lines in sequence. For each activated output line from the vertical shift register 12, outputs from the corresponding row of pixels are placed on output lines 16. While the output from the vertical shift register 12 remains in the active state, a horizontal shift register 14 is activated to shift a pulse along its output lines 17, thereby to activate output transistors 15 in sequence. This places the output signal in sequence upon signal output lines 18. The signal output lines 18 are applied to an amplifier where they are summed and a composite output signal produced.

The conventional image sensor of FIG. 1 suffers from a major drawback, namely, switching transients caused by signal transitions on the output line 17 of the horizontal shift register 14 induce noise in the signal output lines 18. Because this noise occurs at the fixed rate of the horizontal shift register pulses, the noise is termed "fixed-pattern" noise.

It is a specific object of the present invention to provide an image sensor which the amount of fixed-pattern noise is remarkably reduced.

Furthermore, it is an object of the present invention to provide such an image sensor in which the fixed-pattern noise is reduced without requiring complex and costly circuitry.

SUMMARY OF THE INVENTION

In accordance with the above and other objects of the invention, there is provided an image sensor comprising a sensor array, a vertical shift register for activating the sensor array to read out rows of pixels of the array in sequence, and a horizontal shift register for sequentially coupling the outputs of each read-out row of pixels of the sensor array to an output terminal. In accordance with the invention, two horizontal output lines are provided, a real line and a dummy line. Prior to the read-out of each pixel of a row being activated by the vertical shift register, the real and dummy lines are charged to the same reference voltage. The real and dummy lines are arranged such that the switching transients induced on both lines are the same, but only the real line receives the read-out charge from the pixel. A set-reset type flip-flop is connected between the real and dummy lines. Because the noise signals are the same on the two lines, there is no differential voltage between the two inputs to the flip-flop caused by the induced noise. Hence, only the actual signal can effect the final state of the flip-flop. After the flip-flop has been set in this manner, its output is read-out and applied to an output terminal through an amplifier.

A first set of transistors, driven by the horizontal shift register, is provided to sequentially couple the outputs of the sensor array onto the real line. So that the dummy output line has the same noise signal content as the real line, a second set of transistors is provided, arranged similarly to the first set of transistors, but which couple only a floating line sequentially to the dummy line in response to activation by the horizontal shift register.

With the use of the invention, because the noise signal is substantially entirely cancelled in the flip-flop circuit, fixed-pattern noise is substantially entirely eliminated in the output signal.

DESCRIPTION OF THE PREFERRED EMBODIMENTS

Figure 2:
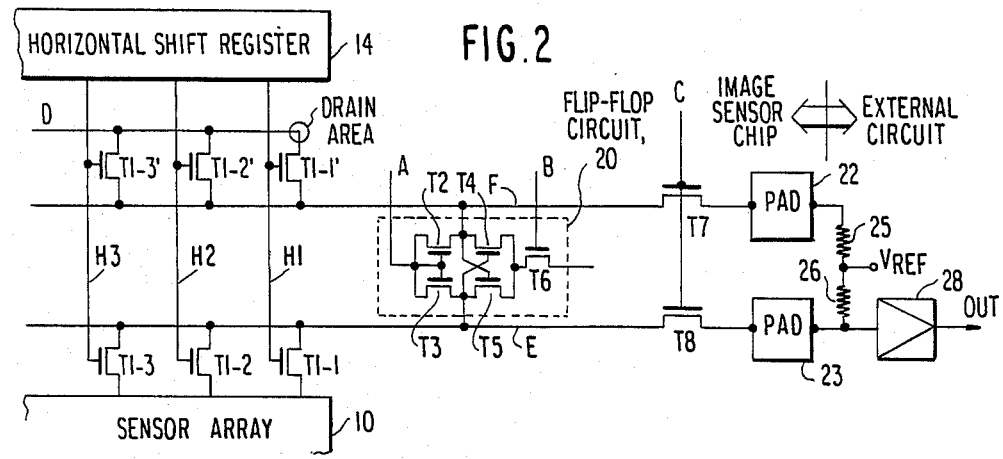
FIG. 2 is a schematic diagram illustrating an image sensor constructed in accordance with the present invention.

Referring now to FIG. 2 of the drawings, an image sensor constructed in accordance with the teachings of the present invention will now be described in detail.

Figure 1:
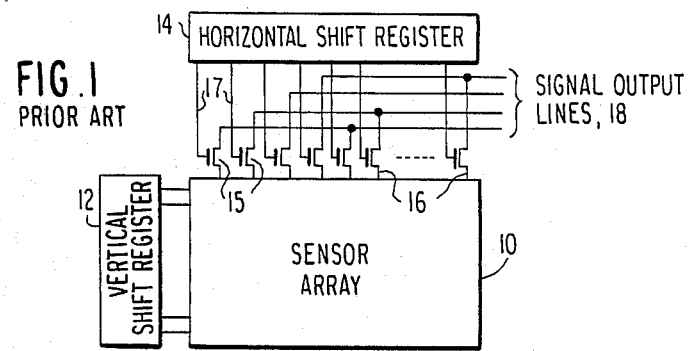
FIG. 1 is a block diagram showing a conventional image sensor.

Similar to the conventional image sensor depicted in FIG. 1, the image sensor of the present invention is provided with a sensor array 10, vertical shift register 12 (not shown), and horizontal shift register 14. FET transistors T1-1, T1-2, T1-3, ... the bases of which are driven by respective outputs of the horizontal shift register 14, are provided to sequentially couple the respective output lines 30 of the sensor array 10 onto a "real" output line E. A "dummy" output line F is also provided, extending parallel to the real line E. A second set of FET transistors T1-1', T1-2', T1-3', ... are provided to sequentially couple a floating line D onto the dummy output line F simultaneously with the coupling of the respective output lines 30 of the sensor array 10 onto the real line E by the corresponding transistors T1-1, T1-2, T1-3, .... The floating line D, preferably made of aluminum, interconnects the drain electrodes of the transistors T1-1', T1-2', T1-3', ....

A set-reset flip-flop circuit 20 is coupled between the real and dummy output lines E and F. Timing signals A and B, as will be explained below in more detail, drive the flip-flop circuit 20. The real and dummy output lines E and F are coupled through respective transistors T8 and T7 to external connection pads 23 and 22, respectively. The transistors T7 and T8 are controlled by a signal C. Externally, a reference voltage $V_{ref}$ is coupled to the pads 22 and 23 via pull-up resistors 25 and 26. The signal on the pad 23 is applied to the input terminal of an amplifier 28, and the final output signal OUT is generated on the output of the amplifier 28.

Figure 3:
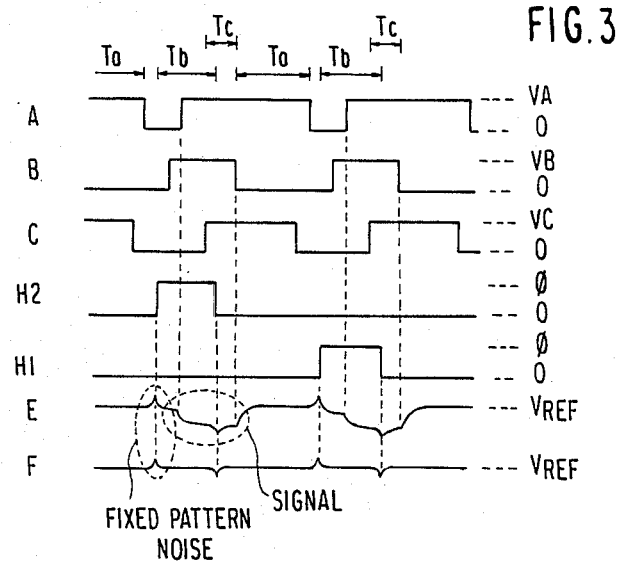
FIG. 3 is a timing diagram used to explain the operation of the circuit of FIG. 2.
Figure 4:
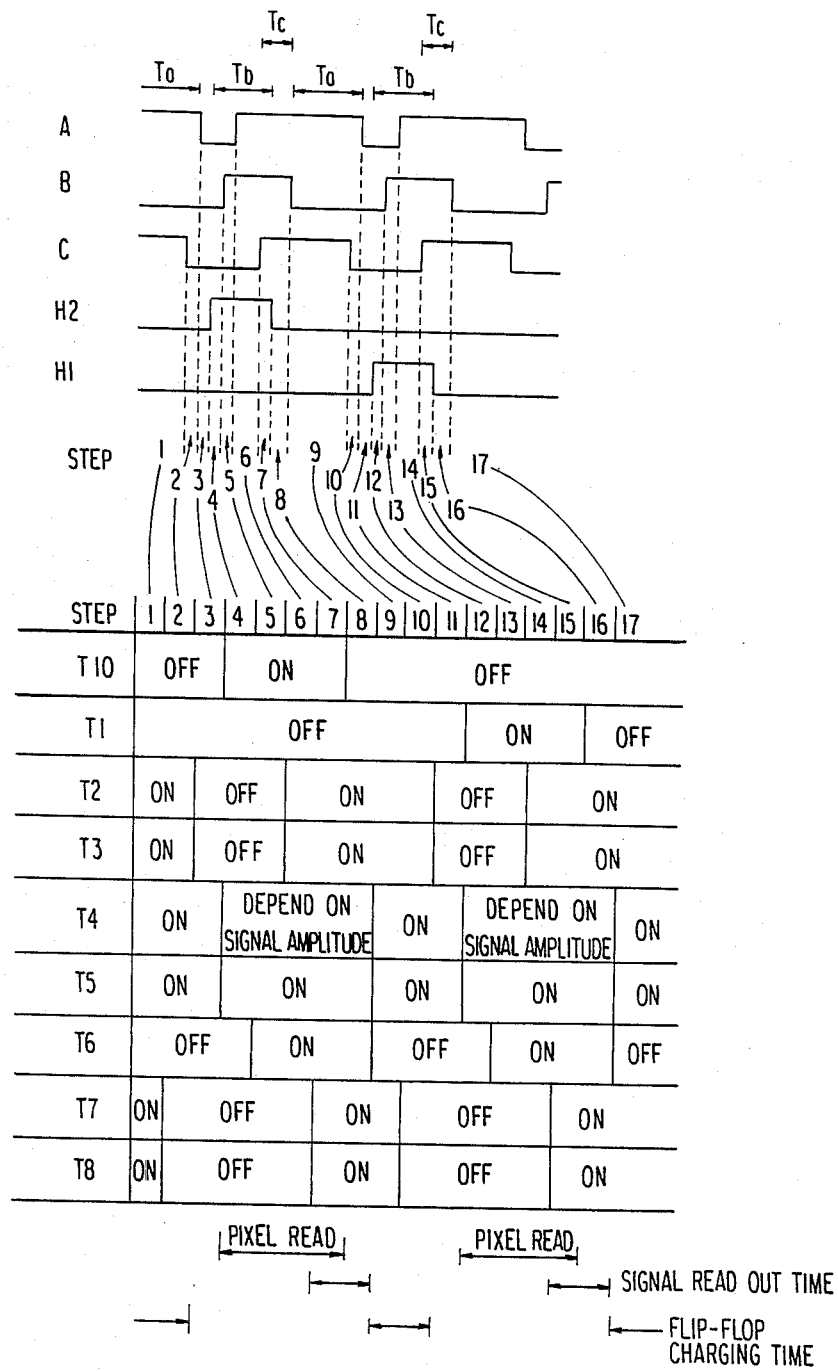
FIG. 4 is a further timing diagram illustrating the various steps in reading out pixel signals in the sensor of the invention.

The operation of the inventive circuit of FIG. 2 will now be explained with reference to the timing diagrams of FIGS. 3 and 4.

It is assumed that all signals employed are positive signals, in which case all transistors are N-channel type devices. Of course, the opposite polarities can be employed.

At the start, the signals A and C and the signal B are low. Accordingly, the real and dummy lines E and F are charged up to the reference voltage $V_{ref}$ through the resistors 25 and 26 and the transistors T7 and T8. This period corresponds to step 1 indicated in FIG. 4. In step 2, when the signal C changes to the low (zero) state, because the signal A is high ($V_A$) and the signal B low, the lines E and F are maintained at $V_{ref}$. Subsequently, in step 3, when the signal A changes to the low state, since all the transistors connected to the lines E and F are off, the potentials of the lines E and F are maintained at $V_{ref}$.

In step 4, when the horizontal shift register 14 raises, as an example, its output line H2 to the high level (O), the transistors T1-2 and T1-2' are simultaneously turned on. Accordingly, the output signal from the respective pixel is coupled through the transistor T1-2 to the real output line E, while the floating line D is coupled to the dummy output line F. As illustrated in FIG. 3, the fixed-pattern noise on the lines E and F is the same since the lines E and F are geometrically similar and the respective sets of drive transistors have similar switching characteristics. Hence, it may be appreciated that the differential voltage between the lines E and F represents only the output signal, that is, the output signal free of fixed-pattern noise.

In step 5, when the signal B goes to the high state ($V_B$), the flip-flop circuit 20, specifically, the transistors T4 and T5, starts to operate. Due to the fact that the signal A in step 5 goes positive, the flip-flop circuit 20 amplifies the differential voltage between the lines E and F, thereby being set in a charge state determined entirely by the signal content. For this purpose, the time period between commencement of steps 5 and 6 (the time between the rise of the signal B and the rise of the signal A) should be small, desirably no more than several nanoseconds.

In step 7, the signal C is taken to the high state, whereupon the transistors T7 and T8 are turned on. The amplified signal may then be read out from the pad 23, amplified by the amplifier 28, and applied to the output terminal OUT.

In step 9, the lines E and F are then again charged due to the low voltage on signal B. At this time, the signals A and C are high, returning them to the same state as in step 1.

The above steps are sequentially repeated for each activation of one of the output lines from the horizontal shift register 14.

In the circuit described above, typical values for the various voltages are as follows: $V_{ref}$ may typically be in a range of 3 to 5 V. The high state of the signal A should then be $V_A = V_{ref} + V_{th}$, where $V_{th}$ is the threshold voltage of the transistors T2 and T3, and is typically about 1 volt. The high-state voltage signals B and C, $V_B$ and $V_C$, as well as O, the maximum voltage for the output signals from the horizontal shift register 14, may typically be in a range of 7 to 10 volts.

Other sequences for the control signals A, B and C may be employed. In a first alternate embodiment, the low periods of the signals A and C are reversed, that is, the signal C goes to the low state after the signal A is already low. In this case, the limitation of the high level of the signal A ($V_A = V_{ref} + V_{th}$) discussed above is relaxed, and the potential of the signals A and F is determined by the reference voltage $V_{ref}$.

In a second alternative embodiment, the signal H2 goes to the low state after the signal B. In this case, the vertical line potential in the image sensor also becomes $V_{ref}$.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. An image sensor comprising:
   an image-sensing pixel array;
   means for sequentially reading image signal charges from said array onto an image output line;
   means for providing a signal corresponding to a noise content of a signal produced on said image output line; and
   producing means for producing an output signal on a sensor output line by cancelling said noise content of said signal produced on said image output line with said signal corresponding to said noise content, wherein said producing means comprises flip-flop circuit means having opposed inputs receiving said signal corresponding to said noise content and said signal produced on said image output line.

2. The image sensor of claim 1, wherein said means for providing said signal corresponding to said noise content comprises a dummy line extending parallel to said image output line.

3. An image sensor comprising:
   an image-sensing pixel array;
   a vertical shift register coupled to said array for reading out pixels of said array a row at a time;
   a horizontal shift register for sequentially reading out pixels of each row by said vertical shift register by activating in sequence output lines of said horizontal shift register;
   a real output line, a dummy output line, and a floating line;
   first and second sets of transistors, one transistor of each of said first and second sets being simultaneously driven by respective output lines of said horizontal shift register, said first set of transistors being coupled between respective output lines of said array and said real output line and said second set of transistors being coupled between said floating line and said dummy output line;
   a flip-flop circuit having opposed inputs coupled respectively to said real output line and said dummy output line;
   an amplifier; and
   means for coupling an output of said flip-flop carrying a signal output from said array to an input of said amplifier.

4. The image sensor of claim 3, further comprising means for charging said real and dummy output lines to a reference voltage level prior to each read out of one of said pixels.

5. The image sensor of claim 4, wherein said charging means comprises means for applying said reference voltage level through said coupling means.

6. The image sensor of claim 5, wherein said means for applying said reference voltage level comprises pull-up resistor means connected to said coupling means via external connection pads.

7. The image sensor of claim 3, wherein said floating line comprises a line interconnecting drain electrodes of said second set of transistors.

8. A method for reading out signal charges from an image-sensing pixel array in such a manner as to produce an output signal free of fixed-pattern noise, comprising the steps of:
   (a) charging a real output line and a dummy output line to a reference voltage;
   (b) connecting an output of a pixel of said array to said real line and connecting a floating line to said dummy output line;
   (c) sensing a difference in voltage between said real output line and said dummy output line;
   (d) repeating steps (a) to (c) for each pixel to be read out; and wherein said step (c) comprises:
   (i) coupling said real and dummy output lines to respective opposed inputs of a flip-flop circuit;
   (ii) allowing said flip-flop circuit to be set to a state determined by voltages on said real and dummy output lines, thereby producing at least one flip-flop output signal; and
   (iii) coupling said at least one said flip-flop output signal to a sensor output terminal.

* * * * *